(12) United States Patent
Lamarre et al.

(10) Patent No.: US 10,801,416 B2
(45) Date of Patent: Oct. 13, 2020

(54) METHOD AND SYSTEM FOR SETTING FUEL FLOW FOR ENGINE START AS A FUNCTION OF AIRCRAFT SPEED

(71) Applicant: PRATT & WHITNEY CANADA CORP., Longueuil (CA)

(72) Inventors: Sylvain Lamarre, Boucherville (CA); Jeremie Hebert, Napierville (CA); Pierre Alexandre, St-Jean-sur-Richelieu (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 346 days.

(21) Appl. No.: 15/585,847

(22) Filed: May 3, 2017

(65) Prior Publication Data

US 2018/0320600 A1    Nov. 8, 2018

(51) Int. Cl.
| | | |
|---|---|---|
| *F02C 9/28* | (2006.01) | |
| *F02C 7/26* | (2006.01) | |
| *F02C 9/44* | (2006.01) | |
| *B64D 31/06* | (2006.01) | |

(52) U.S. Cl.
CPC ............... *F02C 9/28* (2013.01); *B64D 31/06* (2013.01); *F02C 7/26* (2013.01); *F02C 9/44* (2013.01); *F05D 2260/85* (2013.01); *F05D 2270/304* (2013.01); *F05D 2270/3011* (2013.01); *F05D 2270/708* (2013.01)

(58) Field of Classification Search
CPC ...... F02C 9/00; F02C 9/26; F02C 9/28; F02C 9/44; F02C 9/46; F02C 7/26; F02C 7/262; F02C 7/264; B64D 31/06; F05D 2260/85; F05D 2270/301; F05D 2270/3011; F05D 2270/304; F05D 2270/708

See application file for complete search history.

(56) References Cited

U.S. PATENT DOCUMENTS

| | | | |
|---|---|---|---|
| 3,924,141 A | 12/1975 | Yannone et al. | |
| 4,041,696 A | 8/1977 | Morrison | |
| 4,277,940 A * | 7/1981 | Harner ............. | F02C 9/44 60/243 |

(Continued)

FOREIGN PATENT DOCUMENTS

| | | |
|---|---|---|
| EP | 3118437 | 1/2017 |
| GB | 2049239 | 12/1980 |

OTHER PUBLICATIONS

Hall, Nancy, "Inlet Performance", May 5, 2015, https://www.grc.nasa.gov/www/k-12/airplane/inleth.html (Year: 2015).*

(Continued)

*Primary Examiner* — Steven M Sutherland
(74) *Attorney, Agent, or Firm* — Norton Rose Fulbright Canada LLP

(57) ABSTRACT

Herein provided are methods and systems for setting a fuel flow schedule for starting a gas turbine engine of an aircraft. Aircraft speed and engine rotational speed are obtained. A compressor inlet recovered pressure is estimated by combining a first component influenced by the aircraft speed and a second component influenced by the engine rotational speed, and a fuel flow schedule is selected for engine start in accordance with the estimated compressor inlet recovered pressure.

16 Claims, 6 Drawing Sheets

(56) References Cited

U.S. PATENT DOCUMENTS

| | | | | |
|---|---|---|---|---|
| 5,048,285 | A | * | 9/1991 | Schmitt .................... F02C 9/00 |
| | | | | 60/204 |
| 5,129,221 | A | | 7/1992 | Walker et al. |
| 5,212,943 | A | | 5/1993 | Harris |
| 5,907,949 | A | | 6/1999 | Falke et al. |
| 6,988,368 | B2 | | 1/2006 | O'Connor |
| 2010/0241331 | A1 | * | 9/2010 | Duke ..................... F01D 25/18 |
| | | | | 701/100 |
| 2011/0041510 | A1 | | 2/2011 | Sasaki et al. |

OTHER PUBLICATIONS

Extended European Search Report dated Oct. 2, 2018 in connection with European application No. 18170646.6.

\* cited by examiner

METHOD AND SYSTEM FOR SETTING FUEL FLOW FOR ENGINE START AS A FUNCTION OF AIRCRAFT SPEED

TECHNICAL FIELD

The present disclosure relates generally to gas turbine engine starts and re-starts, and more particularly to optimizing turbine engine start and restarts as a function of aircraft speed.

BACKGROUND OF THE ART

Turbine engine start and re-start capabilities are designed based on a characterization performed across the ground and flight envelope. The start and re-start processes involve two phases: direct fuel flow control and sub-idle acceleration governing. While in the sub-idle acceleration mode, a control system adjusts the fuel flow to maintain a pre-defined acceleration reference. The objective is to ensure that the proper fuel and acceleration schedules are identified to efficiently start the engine in all conditions while avoiding undesirable engine behaviour, such as compressor stall, overheating, engine hang, or flameout.

The engine start process may involve conflicting requirements. For example, cold engine acceleration requirements may be dictated by compressor stability, while hot or high speed engine restart acceleration must be high enough to prevent engine flameout. For simplicity, fuel and acceleration schedules are sometimes defined as a compromise that results in limiting the aircraft speed for engine restart or simply not achieving the shortest possible time to idle in all cases.

As such, there is room for improvement.

SUMMARY

In one aspect, there is provided a method for setting a fuel flow schedule for starting a gas turbine engine of an aircraft. The method comprises obtaining an aircraft speed and an engine rotational speed, estimating a compressor inlet recovered pressure by combining a first component influenced by the aircraft speed and a second component influenced by the engine rotational speed, and selecting a fuel flow schedule for engine start in accordance with the estimated compressor inlet recovered pressure.

In another aspect, there is provided a system for setting a fuel flow schedule for starting a gas turbine engine of an aircraft, the engine having a compressor inlet and a compressor outlet. The system comprises a processing unit and a non-transitory computer-readable memory having stored thereon program instructions. The instructions are executable by the processing unit for obtaining an aircraft speed and an engine rotational speed, estimating a compressor inlet recovered pressure by combining a first component influenced by the aircraft speed and a second component influenced by the engine rotational speed, and selecting a fuel flow schedule for engine start in accordance with the estimated compressor inlet recovered pressure.

In a further aspect, there is provided a computer readable medium having stored thereon program code executable by a processor for setting a fuel flow schedule for starting a gas turbine engine of an aircraft, the engine having a compressor inlet and a compressor outlet. The program code comprising instructions for obtaining an aircraft speed and an engine rotational speed, estimating a compressor inlet recovered pressure by combining a first component influenced by the aircraft speed and a second component influenced by the engine rotational speed, and selecting a fuel flow schedule for engine start in accordance with the estimated compressor inlet recovered pressure.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
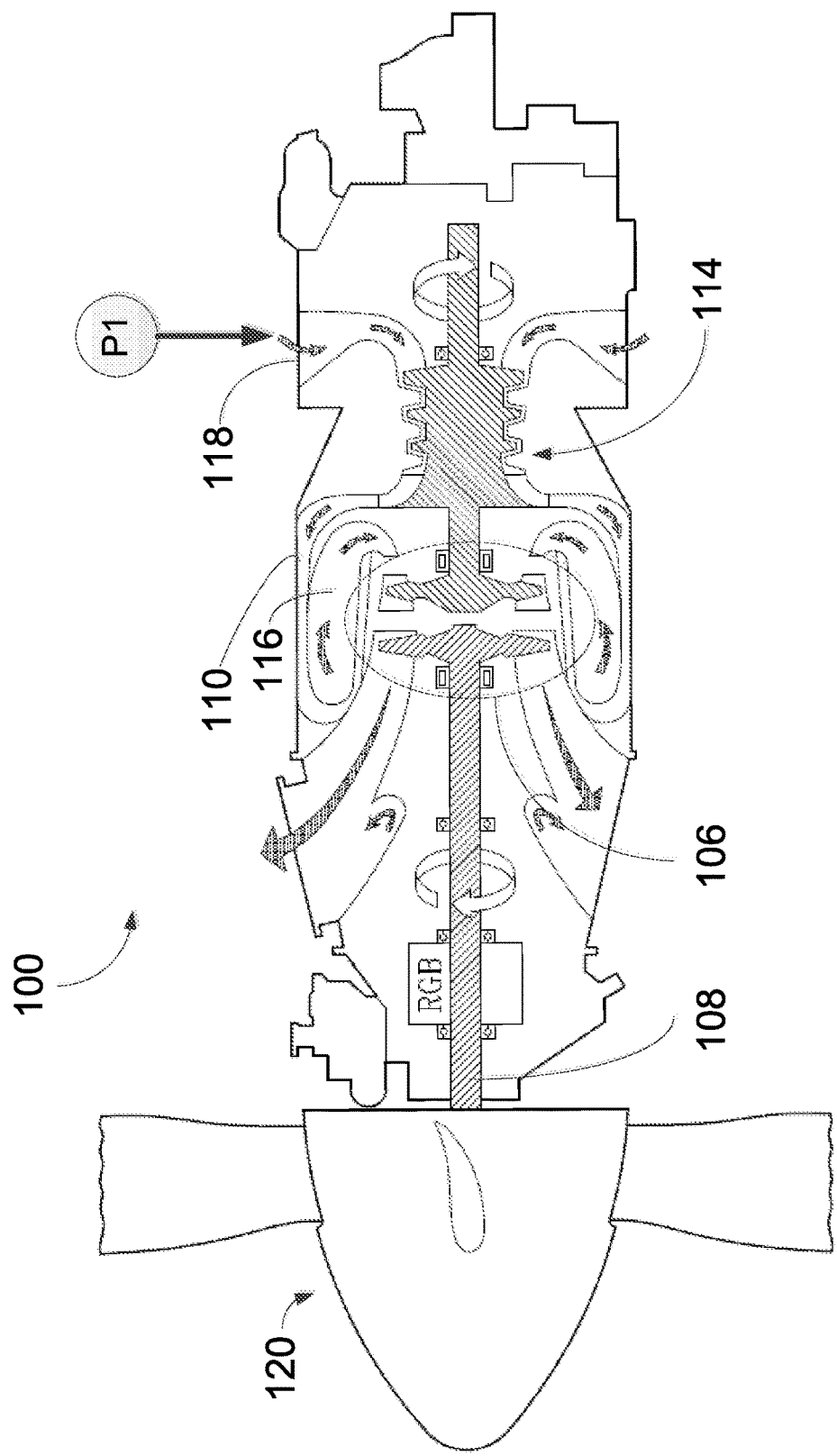
FIG. 1 is a schematic of an example gas turbine engine.

FIG. 1 illustrates a gas turbine engine 100 for which a fuel flow schedule may be set for engine start and/or restart using the systems and methods described herein. Note that while engine 100 is a turboprop engine, the fuel flow schedule setting methods and systems described herein may also be applicable to turbofan engines, turboshaft engines, and auxiliary power units (APU).

Engine 100 generally comprises in serial flow communication a propeller 120 attached to a shaft 108 and through which ambient air is propelled, a compressor section 114 for pressurizing the air, a combustor 116 in which the compressed air is mixed with fuel and ignited for generating an annular stream of hot combustion gases, and a turbine section 106 for extracting energy from the combustion gases. The compressor 114 has an inlet 118 and an outlet 110.

Figure 2:
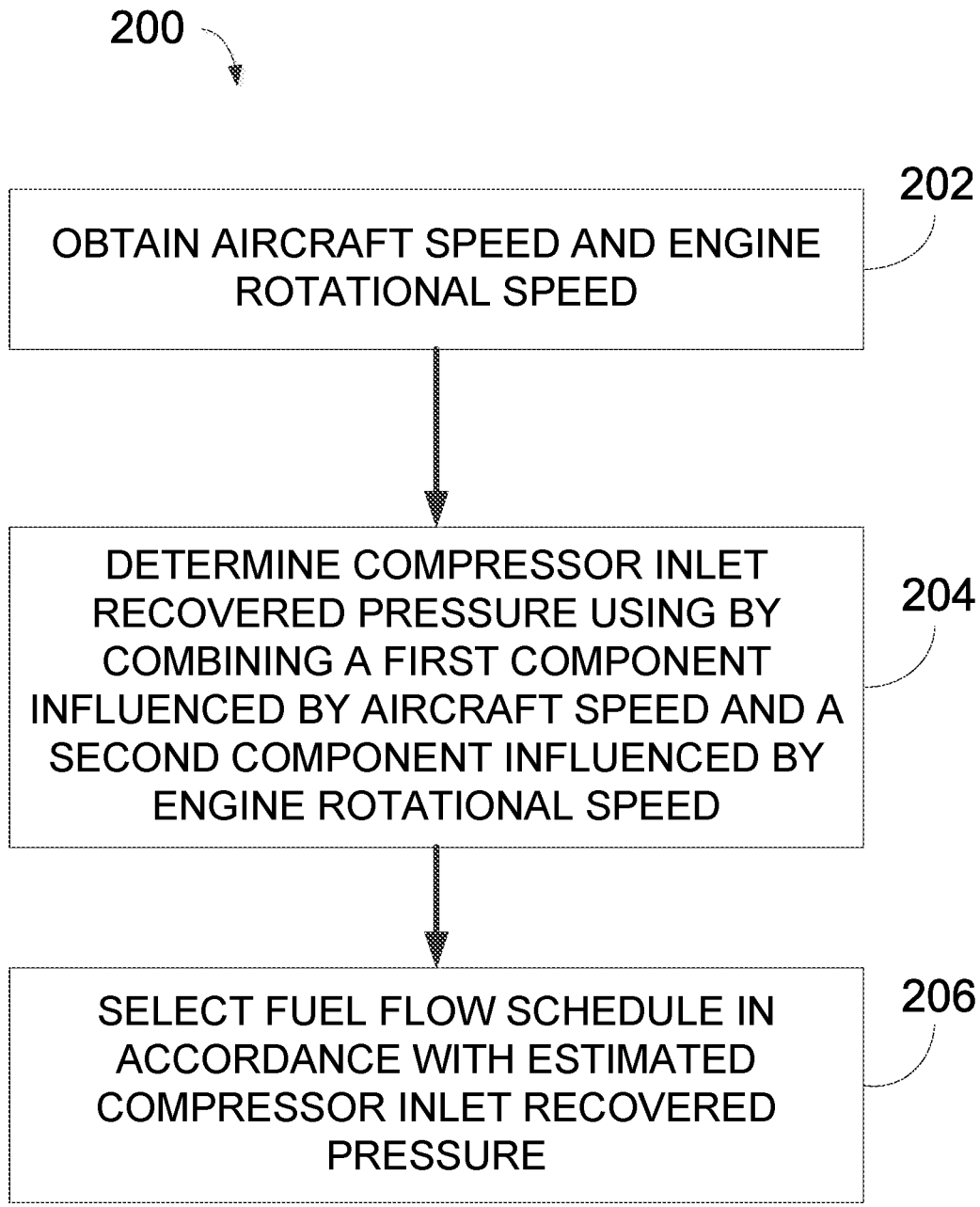
FIG. 2 is a flowchart of an example method for setting a fuel flow schedule for starting a gas turbine engine.

With reference to FIG. 2, there is illustrated a flowchart of an example method 200 for setting a fuel flow schedule for starting a gas turbine engine, such as engine 100 of FIG. 1. Note that the expressions "engine start" and "starting an engine" are used throughout the present disclosure to refer to both engine starts and restarts. The method 200 is used to select a suitable fuel flow schedule as a function of aircraft speed. It may also be used to provide enough fuel flow to prevent flameout during the closed loop phase of the start process, when the aircraft is flying at high speed. More specifically, aircraft speed is used to adjust a direct flow command to the engine in order to optimize the engine start process and improve time to idle.

In some embodiments, method 200 is triggered upon receipt of an engine start request. At step 202, two parameters are obtained, namely aircraft speed and engine rotational speed. Aircraft speed refers to airspeed, i.e. the speed of the aircraft relative to the air. In some embodiments, the airspeed is taken from an airspeed gauge connected to a pilot static system and corresponds to indicated airspeed. In some embodiments, the indicated airspeed is obtained as an airspeed signal generated from one or more pitot probes facing on-coming air flow to measure pitot pressure and one or more static ports to measure the static pressure in the air flow. In other embodiments, the air speed corresponds to calibrated airspeed, which is the indicated airspeed corrected for instrument errors, position errors, and/or installation errors. In yet other embodiments, the airspeed is an equivalent airspeed, which is a measure of airspeed that is a function of incompressible dynamic pressure, or true airspeed, which is the speed of the aircraft relative to the atmosphere. Any suitable airspeed measurement may be used. In some embodiments, airspeed is converted to Mach number so as to allow direct isentropic calculations. Engine rotational speed refers to the speed of rotation of the core shaft of the engine 100, and may be specified in revolutions per minute (rpm), revolutions per second (rev/s), or radians per second (rad/s). Engine rotational speed may be measured using any suitable sensor, or calculated as a function of other engine parameters, such as engine torque or harmonic frequency components of vibration signals.

At step 204, a compressor inlet recovered pressure is determined. Referring back to FIG. 1, the recovered pressure at the compressor inlet 118 is illustrated as P1. In some embodiments, method 200 is applied to engines, such as engine 100, that do not feature compressor inlet pressure sensors. As such, P1 is determined, or estimated, using other techniques. In some embodiments, P1 is estimated by combining a first component influenced by the aircraft speed and a second component influenced by the engine rotational speed.

Figure 3:
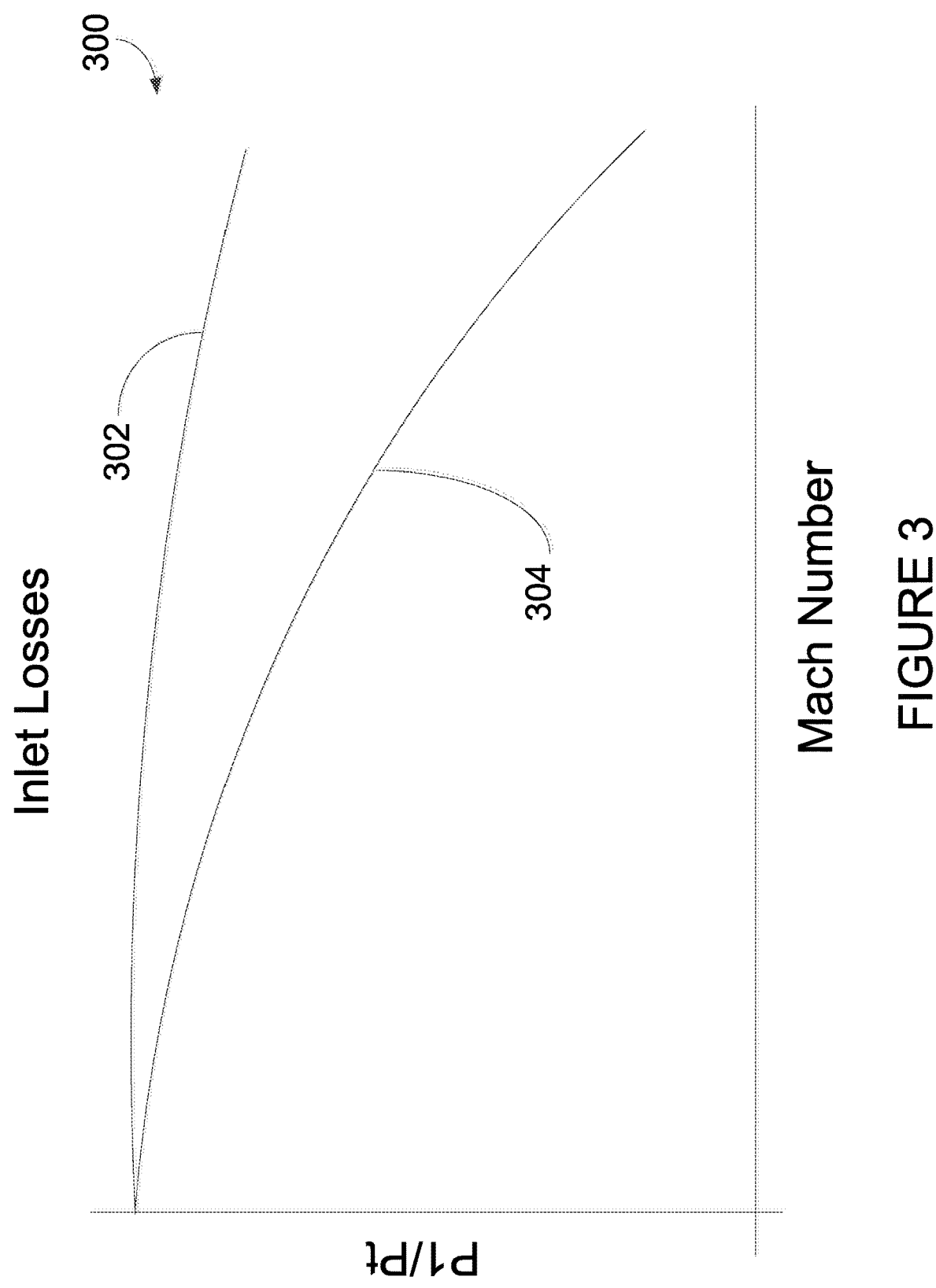
FIG. 3 is a graph with example characterization data for inlet losses influenced by aircraft speed.

The first and second components may be determined using various techniques, one of which is the use of characterization data. More specifically, inlet losses due to aircraft speed and engine rotational speed may be characterized (or measured) for a given inlet design during aircraft flight tests. Referring to FIG. 3, there is illustrated a graph 300 showing example characterization data for inlet losses influenced by aircraft speed, as represented by Mach number. The x-axis corresponds to Mach number and the y-axis corresponds to a ratio of compressor inlet recovered pressure (P1) to total air pressure (Pt).

In some embodiments, characterization is performed using two different positions for an inlet bypass door, namely opened and closed. Curve 302 corresponds to a data set for a closed inlet bypass door while curve 304 corresponds to a data set for an opened inlet bypass door.

Using the known airspeed and the position of the inlet bypass door at the time of receipt of the engine start request, a first value for P1/Pt is determined from graph 300. This first value is the first component for the estimated compressor inlet recovered pressure as influenced by aircraft speed.

Figure 4:
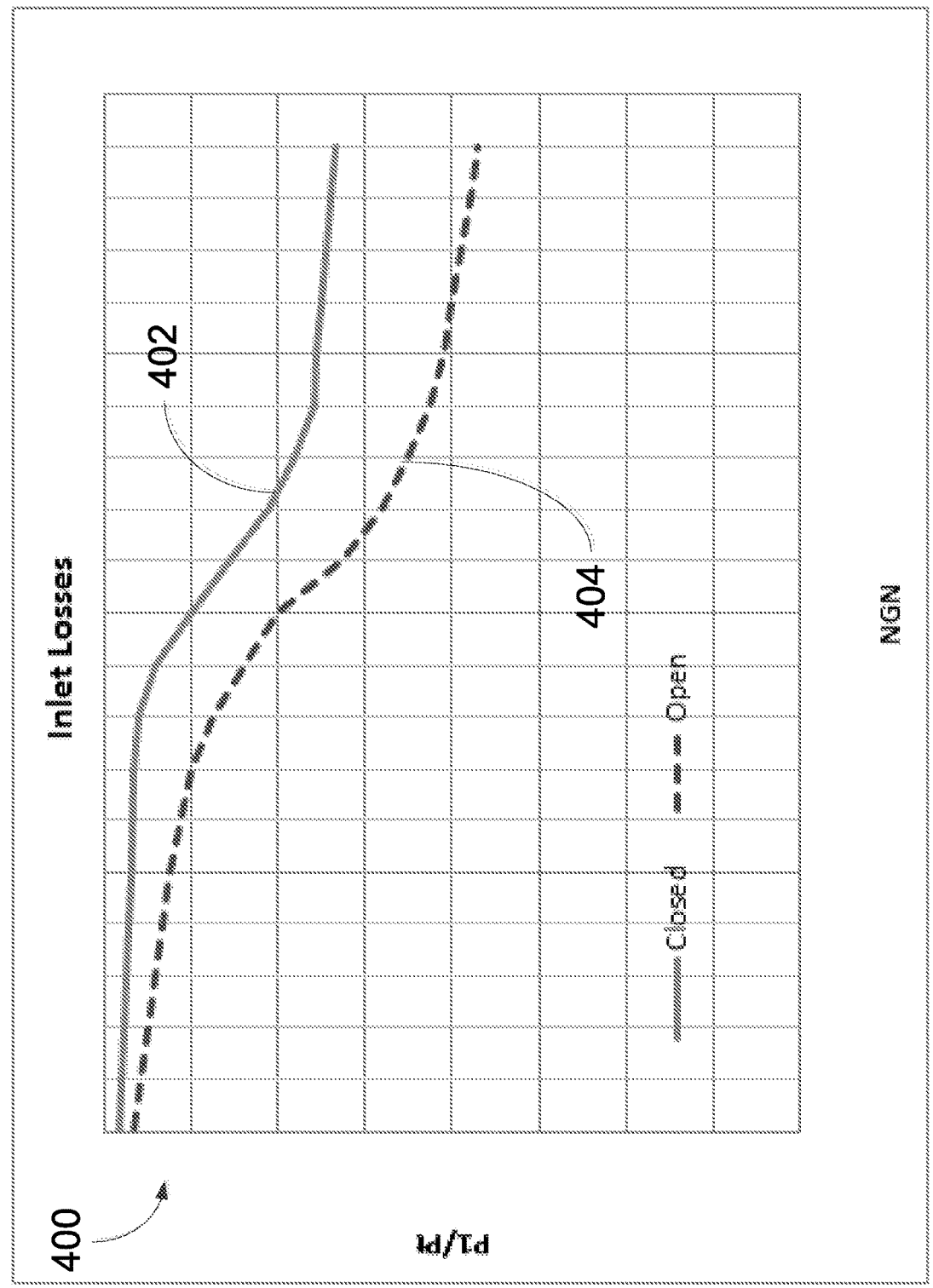
FIG. 4 is a graph with example characterization data for inlet losses influenced by engine rotational speed.

FIG. 4 illustrates example characterization data for inlet losses influenced by engine rotational speed, as shown in graph 400. This characterization data may be determined during aircraft flight tests or while the aircraft is static, as it relates to the engine only and is independent of altitude and speed of the aircraft. The x-axis corresponds to a normalized engine rotational speed (NGN) while the y-axis corresponds to P1/Pt. Note that the engine rotational speed does not need to be normalized. In the embodiment illustrated, curve 402 corresponds to a data set for a closed inlet bypass door and curve 404 corresponds to a data set for an opened inlet bypass door. Using the engine rotational speed obtained in step 202, a second value for P1/Pt is obtained from graph 400. This second value is the second component for the estimated compressor inlet recovered pressure as influenced by engine rotational speed.

Figure 5:
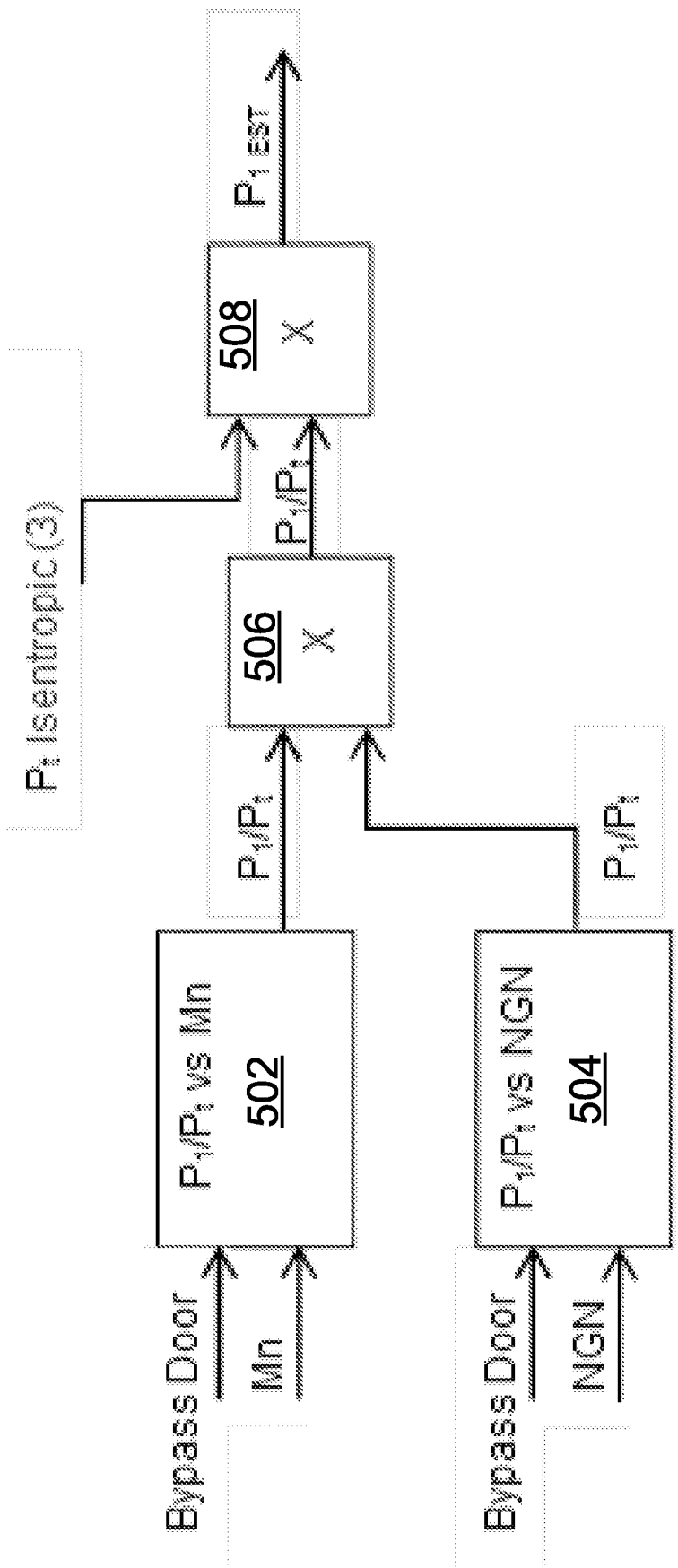
FIG. 5 is a block diagram of an example embodiment for estimating a compressor inlet recovery pressure.

In some embodiments, the first and second components are combined in accordance with the block diagram illustrated in FIG. 5. Blocks 502 and 504 represent the first and second components, as determined in accordance with the position of the inlet bypass door and airspeed (or Mach number) for the first component, engine rotational speed for the second component. At block 506, the first and second components, i.e. the first value of P1/Pt and the second value of P1/Pt are multiplied together and a third value for P1/Pt is output. At block 508, the third value of P1/Pt is multiplied by an isentropic total air pressure (Pt_isentropic) in order to remove the total air pressure component from P1/Pt and isolate P1 as the estimated inlet recovered pressure.

The isentropic total air pressure is found as a function of aircraft speed, using:

$$\frac{P_{t\_isentropic}}{P_{amb}} = \left(1 + \frac{y-1}{2}M^2\right)^{\frac{y}{y-1}} \quad (1)$$

In equation (1), M is the Mach number of the aircraft, Pamb is the ambient pressure, and y is a heat capacity ratio (also called adiabatic index). For air, y=1.4. Other techniques for finding Pt_isentropic may also be used, for example using a lookup table instead of performing a calculation. Similarly, other formulas may also be used.

Referring back to FIG. 2, once the estimated inlet recovered pressure is obtained, the method 200 moves on to step 206, where a fuel flow schedule is selected in accordance with the estimated P1. For example, a lookup table may be used to correlate P1 values with corresponding flow schedules for engine starts. In some embodiments, a ratio of P1 to Pamb is used to select the fuel flow schedule.

In some embodiments, selecting the fuel flow schedule comprises applying a fuel flow bias to an original fuel flow schedule. For example, a fuel flow bias may be determined using:

$$\text{Fuel flow bias} = \left(\frac{P_1}{P_{amb}} - 1\right) * C \quad (2)$$

In equation (2), $P_1$ is the estimated compressor inlet recovered pressure, $P_{amb}$ is ambient pressure, and C is a value selected from a table correlating $$\frac{P_1}{P_{amb}}$$

with a required start fuel flow at maximum aircraft speed. The computed fuel flow bias corresponds to a compensation of fuel flow to be added (or subtracted) from the original fuel flow schedule in order to account for the aircraft speed.

In some embodiments, engine starts are performed in three steps, namely a first step of acceleration which leads to light-off, followed by a second step of setting the fuel flow in an open loop process, followed by a third step of acceleration control in a closed loop process. In accordance with some embodiments, method 200 is used to select the fuel flow schedule to be used during the second step of the engine start, in the open loop process. In some embodiments, the fuel flow schedule applied during the second step is also used in the third step, as a minimum fuel flow limit. The minimum fuel flow is then adjusted as required until idle is reached.

Figure 6:
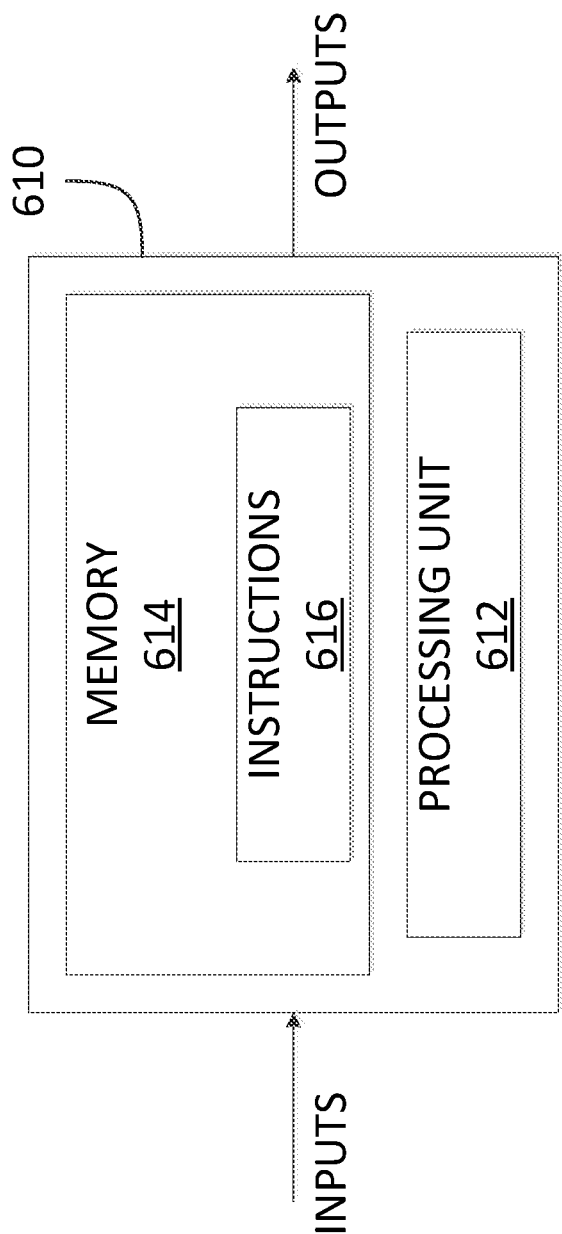
FIG. 6 is a block diagram of an example computing device for implementing the method of FIG. 2.

With reference to FIG. 6, the method 200 may be implemented by a computing device 610, comprising a processing unit 612 and a memory 614 which has stored therein computer-executable instructions 616. The processing unit 612 may comprise any suitable devices configured to implement the method 200 such that instructions 616, when executed by the computing device 610 or other programmable apparatus, may cause the functions/acts/steps performed as part of the method 200 as described herein to be executed. The processing unit 612 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof. Note that the computing device can be implemented as part of a full-authority digital engine controls (FADEC) or other similar device, including electronic engine control (EEC), engine control unit (EUC), and the like.

The memory 614 may comprise any suitable known or other machine-readable storage medium. The memory 614 may comprise non-transitory computer readable storage medium, for example, but not limited to, an electronic, magnetic, optical, electromagnetic, infrared, or semiconductor system, apparatus, or device, or any suitable combination of the foregoing. The memory 614 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 614 may comprise any storage means (e.g., devices) suitable for retrievably storing machine-readable instructions 616 executable by processing unit 612.

The methods and systems for setting a fuel flow schedule for starting a gas turbine engine of an aircraft described herein may be implemented in a high level procedural or object oriented programming or scripting language, or a combination thereof, to communicate with or assist in the operation of a computer system, for example the computing device 610. Alternatively, the methods and systems for setting a fuel flow schedule for starting a gas turbine engine of an aircraft may be implemented in assembly or machine language. The language may be a compiled or interpreted language. Program code for implementing the methods and systems for detecting failure of a sensor in a control system may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for setting a fuel flow schedule for starting a gas turbine engine of an aircraft may also be considered to be implemented by way of a non-transitory computer-readable storage medium having a computer program stored thereon. The computer program may comprise computer-readable instructions which cause a computer, or more specifically the processing unit 612 of the computing device 610, to operate in a specific and predefined manner to perform the functions described herein, for example those described in the method 200.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for setting a fuel flow schedule for starting a gas turbine engine of an aircraft may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for setting a fuel flow schedule for starting a gas turbine engine of an aircraft, the method comprising:
    obtaining an aircraft speed and an engine rotational speed;
    estimating a pressure at an entrance of a compressor of the gas turbine engine by combining a first component on which the aircraft speed has an effect and a second component on which the engine rotational speed has an effect; and
    applying a fuel flow bias associated with the pressure as estimated to a fuel flow schedule for engine start, wherein a change in pressure as estimated results in a change of the fuel flow bias.

2. The method of claim 1, wherein estimating the pressure at the entrance of the compressor comprises using characterization data of losses at the entrance of the compressor of the engine due to the aircraft speed and due to the engine rotational speed.

3. The method of claim 2, wherein estimating the pressure comprises converting the aircraft speed into a Mach number and plotting Mach number versus a ratio of the pressure at the entrance of the compressor of the engine and an isentropic total air pressure to obtain the first component.

4. The method of claim 3, wherein estimating the pressure comprises using a curve plotting a normalized engine rotational speed versus the ratio of the pressure over the isentropic total air pressure to obtain the second component.

5. The method of claim 4, wherein the first component corresponds to a first value for the ratio and the second component corresponds to a second value for the ratio, wherein the first value and the second value are multiplied together, and wherein a result of the multiplication is multiplied by the isentropic total air pressure to obtain the pressure as estimated.

6. The method of claim 1, further comprising applying the fuel flow schedule during an open loop step of engine start.

7. The method of claim 6, further comprising setting the fuel flow schedule with the fuel flow bias applied as a minimum fuel flow limit during a closed loop step of engine start.

8. A system for setting a fuel flow schedule for starting a gas turbine engine of an aircraft, the system comprising:
- a processing unit; and
- a non-transitory computer-readable memory having stored thereon program instructions executable by the processing unit for:
  - obtaining an aircraft speed and an engine rotational speed;
  - estimating a pressure at an entrance of a compressor of the gas turbine engine by combining a first component on which the aircraft speed has an effect and a second component on which the engine rotational speed has an effect; and
  - applying a fuel flow bias associated with the pressure as estimated to a fuel flow schedule for engine start, wherein a change in pressure as estimated results in a change of the fuel flow bias.

9. The system of claim 8, wherein estimating the pressure at the entrance of the compressor comprises using characterization data of losses at the entrance of the compressor of the engine due to the aircraft speed and due to the engine rotational speed.

10. The system of claim 9, wherein estimating the pressure comprises converting the aircraft speed into a Mach number and plotting Mach number versus a ratio of the pressure at the entrance of the compressor of the engine and an isentropic total air pressure to obtain the first component.

11. The system of claim 10, wherein estimating the pressure comprises using a curve plotting a normalized engine rotational speed versus the ratio of the pressure over the isentropic total air pressure to obtain the second component.

12. The system of claim 11, wherein the first component corresponds to a first value for the ratio and the second component corresponds to a second value for the ratio, wherein the first value and the second value are multiplied together, and wherein a result of the multiplication is multiplied by the isentropic total air pressure to obtain the pressure as estimated.

13. The system of claim 8, wherein the program instructions are further executable for applying the fuel flow schedule during an open loop step of engine start.

14. The system of claim 8, wherein the program instructions are further executable for setting the fuel flow schedule with the fuel flow bias applied as a minimum fuel flow limit during a closed loop step of engine start.

15. A computer readable medium having stored thereon program code executable by a processor for setting a fuel flow schedule for starting a gas turbine engine of an aircraft, the program code comprising instructions for:
- obtaining an aircraft speed and an engine rotational speed;
- estimating a pressure at an entrance of a compressor of the gas turbine engine by combining a first component on which the aircraft speed has an effect and a second component on which the engine rotational speed has an effect; and
- applying a fuel flow bias associated with the pressure as estimated to a fuel flow schedule for engine start, wherein a change in pressure as estimated results in a change of the fuel flow bias.

16. The computer readable medium of claim 15, wherein estimating the pressure at the entrance of the compressor comprises using characterization data of losses at the entrance of the compressor of the engine due to the aircraft speed and due to the engine rotational speed.

* * * * *